United States Patent [19]
Seilly et al.

[11] 3,938,013
[45] Feb. 10, 1976

[54] D.C. MOTOR CONTROL SYSTEM EFFECTING CHANGES IN THE CONNECTIONS OF THE ARMATURE AND VARIATIONS IN CURRENT FLOW THROUGH THE FIELD

[75] Inventors: Alec Harry Seilly, North Wembley; Kenneth Clive Scott, London; Kenneth Leslie Driver, Weighbridge, all of England

[73] Assignee: C.A.V. Limited, Brimingham, England

[22] Filed: June 7, 1974

[21] Appl. No.: 477,408

[30] Foreign Application Priority Data
June 9, 1973  United Kingdom............... 27574/73

[52] U.S. Cl. .................. 318/92; 318/111; 318/278; 318/387; 318/405; 318/493; 318/497
[51] Int. Cl.² .......................................... H02P 1/16
[58] Field of Search ..................... 318/64, 92–95, 318/111, 276–278, 385, 387–390, 404–410, 493, 495, 497, 503, 504, 505

[56] References Cited
UNITED STATES PATENTS

| 517,105 | 3/1894 | Henderson | 318/409 |
|---|---|---|---|
| 2,331,228 | 10/1943 | Purifoy | 318/92 |
| 2,521,182 | 9/1950 | Georges-Gabriel et al. | 318/92 |
| 3,267,345 | 8/1966 | Boening | 318/92 |
| 3,321,684 | 5/1967 | Stamm | 318/92 |
| 3,564,342 | 2/1971 | Sanders | 318/93 |
| 3,800,197 | 3/1974 | Mehta | 318/93 |
| 3,803,465 | 4/1974 | Akamatsu | 318/111 |

*Primary Examiner*—James R. Scott
*Assistant Examiner*—John J. Feldhaus
*Attorney, Agent, or Firm*—Holman & Stern

[57] ABSTRACT

A d.c. motor control system includes a pair of armature windings mounted on a single rotor or on a pair of mechanically coupled rotors, and a field winding or windings. The system includes switch means operable to effect a change in the electrical connections of the armature windings to a pair of electrical supply terminals and means for effecting variations of the current flowing in the field winding or windings.

5 Claims, 8 Drawing Figures

D.C. MOTOR CONTROL SYSTEM EFFECTING CHANGES IN THE CONNECTIONS OF THE ARMATURE AND VARIATIONS IN CURRENT FLOW THROUGH THE FIELD

This invention relates to a d.c. motor system and has for its object to provide such a system in a simple and convenient form.

According to the invention a d.c. motor control system comprises a pair of armature windings mounted on a single rotor or on a pair of mechanically coupled rotors, a field winding or windings, the system including switch means operable to effect a change in the electrical connections of the armature windings to a pair of electric supply terminals and means for effecting variation of the current flowing in the field winding or windings.

Figure 1:
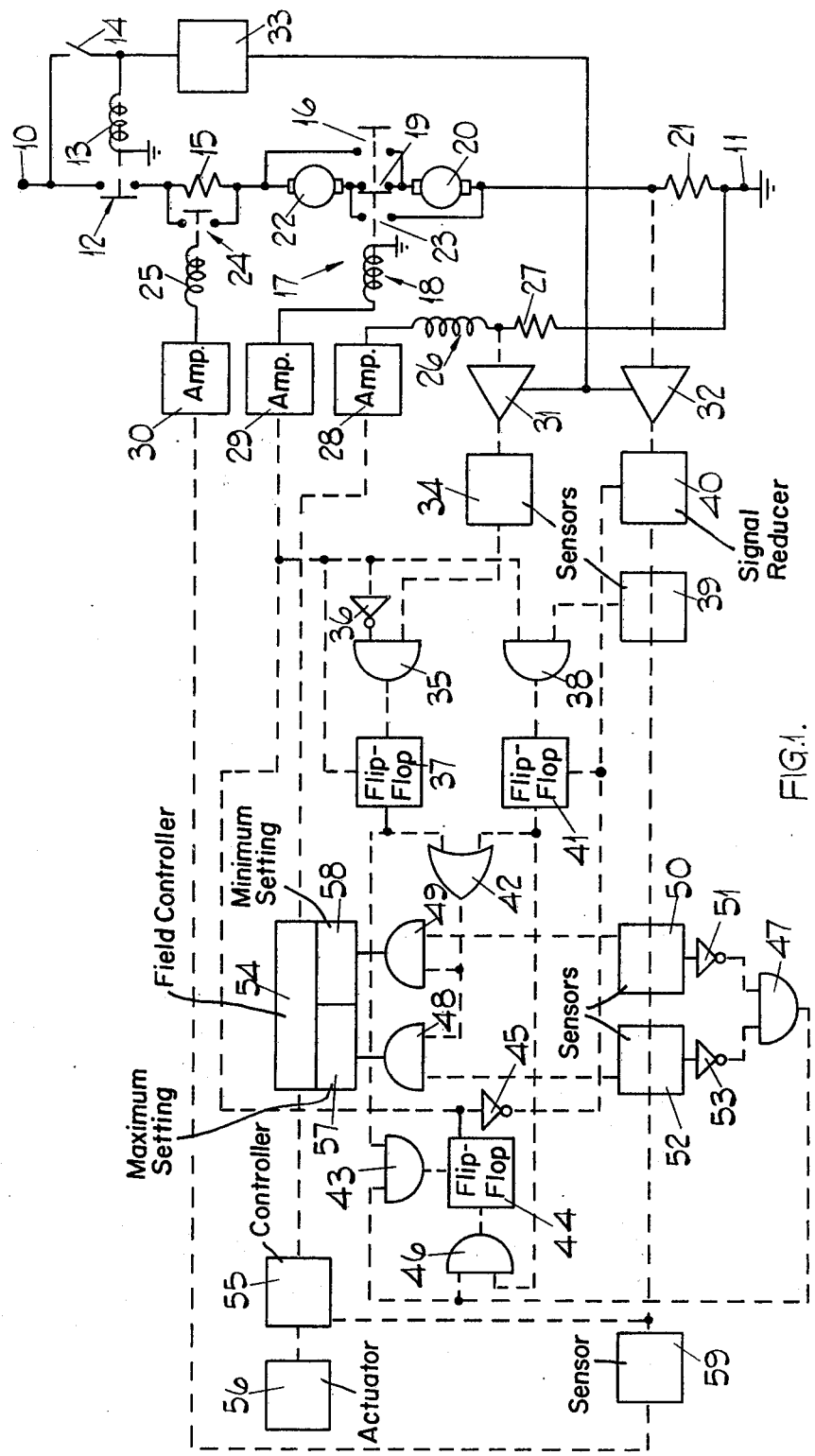
Figure 2:
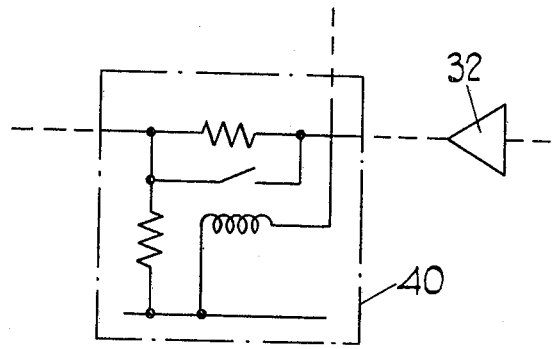
Figure 8:
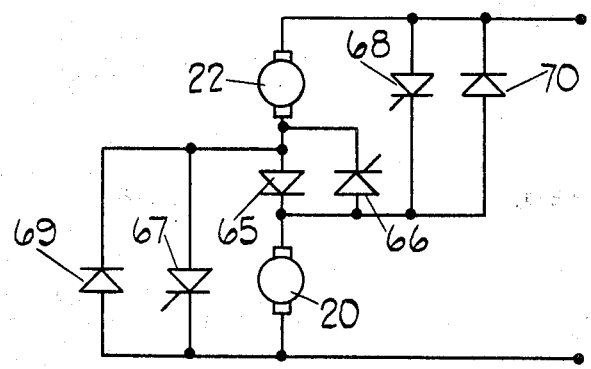

One example of a d.c. motor system in accordance with the invention will now be described with reference to the accompanying drawings in which:

FIG. 1 is a block diagram of the system,

FIGS. 2–7 inclusive are electrical circuits of individual modules of the system, and FIG. 8 shows an electrical contactor for use in place of the electro-mechanical contactor shown in FIG. 1.

Referring to FIG. 1, there are provided terminals 10, 11 for connection to a source of d.c. supply, conveniently a storage accumulator.

Terminal 10 is connected to one contact of a single pole contactor 12 having a control winding 13, the latter being connected between terminals 10 and 11 by way of an operator controlled switch 14. The other contact of the contactor 12 is connected by way of a resistor 15 to one of a pair of contacts 16 of an electromechanical changeover contactor 17 having an operating winding 18. The other contact of the pairs of contacts 16 is connected to one contact of a further pair of contacts 19, and also to one brush associated with a commutator of one armature winding 20 of a d.c. motor. The other brush of the winding 20 is connected by way of a resistor 21 with the terminal 11. The other contact of the contacts 19 is connected to one brush associated with a commutator of the other armature winding 22 of the motor and the other brush of this winding is connected to the resistor 15. Finally the contactor 17 includes a further pair of contacts 23, one of which is connected to the one contact of the pair of contacts 19 which is connected to the brush of the armature winding 22, and the other contact of the pair of contacts 23 is connected by way of the resistor 21 to the terminal 11. For co-operation with the contacts 16, there is provided a normally open moving contact bar and a further moving contact bar is associated with the contacts 19, 23. Normally the second contact bar bridges the contacts 19, but when the winding 18 is energised, the contact bar moves to bridge the contacts 23. There is also provided a single pole contactor 24 including an operating coil 25, and the contacts of the contactor 24 are connected in parallel with the resistor 15.

The motor also includes a shunt field winding 26, one end of which is connected to the terminal 11 by way of a resistor 27. The other end of the field winding is connected to a power amplifier 28, and further power amplifiers 29, 30 are connected to the windings 18 and 25 of the contactors 17, 24 respectively. The resistors 21 and 27 are conveniently constituted by the cable resistance of the connecting cables. All the connections so far described are concerned either with heavy current flowing in the armature windings are with moderate currents flowing in the field winding and contactor coils. They are thus shown in continuous line, the remaining connections to be described are concerned with signals utilized in the system to control the operation of the motor and are thus shown in dotted outline.

Also provided are a pair of signal amplifiers 31, 32 amplifier 31 having its input connected to a point intermediate the shunt field winding 26 and the resistor 27, and amplifier 32 having its input connected to a point intermediate the armature winding 20 and the resistor 21. The amplifiers 31 and 32 are provided with a d.c. supply by means of an invertor 33 which is supplied with power from terminal 10 by way of switch 14. The output from amplifier 31 is supplied to a module 34 the output of which is supplied to one input of an 'AND' gate 35. The other input of the 'AND' gate 35 is connected to the input of the amplifier 29 by way of an invertor 36 and the output of the AND gate 35 is applied to a flip flop circuit 37 which is able to receive a reset signal constituted by the input signal to the power amplifier 29. In addition, the input of the power amplifier 29 is connected to one input terminal of an AND gate 38 the other input terminal of which is connected to a maximum armature current sensor 39. The input of this sensor is derived from the output of the amplifier 32 by way of a module 40. The output of the AND gate 38 is connected to a flip flop 41 which supplies one input terminal of an 'OR' gate 42, the other input terminal of which is connected to the output of the flip flop 37. The output of the flip flop 37 is also connected to one input terminal of an AND gate 43, and this AND gate is able to supply a reset signal to a flip flop 44. The output of the flip flop 44 is connected to the power amplifier 29 and also it provides a reset signal by way of an invertor 45 to the flip flop 41 and a mode signal to the module 40. The module 40 reduces by half the signal derived from the amplifier 32 when the rotor windings 21, 22 are connected in the parallel mode.

The input of the flip flop 44 is connected to the output of an AND gate 46, one input of which is connected to the output of the flip flop 41, and the other input of which is connected to the output of an AND gate 47. In addition, the output of the AND gate 47 is connected to the other input of the AND gate 43.

There is also provided a pair of AND gates 48, 49 and one input of each of these gates is connected to the output of the OR gate 42. The other input of the AND gate 49 is derived from a sensor 50 which is responsive to the value of the current flowing in the armature as represented by the signal derived from the module 40. An output from this sensor is also provided by way of an invertor 51 to one of the inputs of the AND gate 47. The other input terminal of the AND gate 48 is connected to a further armature current sensor 52, and this provides the other input to the AND gate 47 by way of an invertor 53.

There is also provided a field controller 54, and the output of this is connected to the power amplifier 28. The field controller is of the chopper type, and it is controlled in part by a controller 55 which in turn is controlled by an actuator 56 operable by the operator of the system. The controller 55 receives a signal representing the armature current of the motor, and can effect a control over the field controller 54 so as to ensure that the field current does not decrease below a predetermined value when the motor is accelerating.

The field controller 54 is also in part controlled by a module 57 which receives an input from the AND gate 48. The function of the module 57 is to set the maximum value of the field current. In addition, a further module 58 is provided, and sets the minimum value of the field current. The module 58 is controlled by the AND gate 49. Finally a sensor 59 is provided, and which senses the flow of armature current and provides a signal to the power amplifier 30 when the armature current has fallen to a predetermined value when the motor has been energised.

In use, when the system is at rest, the various switches are in the positions shown in the drawing and when the operator requires to effect operation of the motor, the switch 14 is closed. This has the effect of energising the coil 13, and therefore closing the contacts of the contactor 12. The contactor 17 is arranged such that initially the armature windings 20 and 22 are electrically connected in series, and the contactor 24 ensures that the starting resistor 15 is connected in series with the armature windings. As a result, the motor is series connected and starts to rotate, the current being limited by the resistor 15. At starting, the maximum value of field current flows in the shunt field winding 26, this being determined by the armature current feedback loop 32 and 55.

As the armature speed increases, the back EMF increases, and the armature current decreases. When the armature current has reduced to the predetermined value, the sensor 59 detects the reduction in current and a signal is applied to the power amplifier 30 which effects energisation of the winding 25. As a result of this, the resistor 15 is effectively taken out of circuit.

When it is required to accelerate the motor, the actuator 56 is operated to cause the controller 54 to weaken the field current flowing in the shunt field. As the field is weakened the back EMF decreases, and hence the current flow increases thereby increasing the output torque and accelerating the armature. In order to limit the armature current and thereby ensure good commutation, the amount that the field current can be decreased is limited by means of the module 55. This module receives a signal indicative of the armature current.

When the field current has been reduced to a given amount and the armature current has also reduced to a predetermined amount, the situation is attained at which the armature windings 20 and 22 can be switched into a parallel connection. The switching is of course achieved by the contactor 17, the operating coil 18 of which receives power from the amplifier 29. At the instant of switch-over, it is arranged that the armature current is reduced to practically zero in order to preserve the life of the contacts of the contactor 17. This is achieved by signals derived from the amplifier 31 and sensor 34 which effects switching of the flip flop 37 by way of the AND gate 35. Flip flop 37 provides a signal which triggers AND gate 48 by way of OR gate 42. Flip flop 37 also provides a signal to AND gate 43 thereby conditioning it so that when a signal from AND gate 47 is received it will initiate the operation of the contactor 17 by way of flip flop 44 and the power amplifier 29. When the AND gate 48 is signalled, it provides a signal to the module 57 to switch the field current to its maximum value, and this temporarily puts the motor into the generator mode so that the armature current changes direction. Clearly the armature current cannot change direction immediately and gradually reduces to zero. This is detected by the sensors 50 and 52, and the AND gate 47 provides a signal to the AND gate 43 causing operation of the contactor as stated above. When the flip flop 44 switches over, the signal to the module 40 is removed so that the sensors 39 and 52 and the controller 55 receive the correct armature current indicating signal to give the required field strength for satisfactory changeover. Acceleration of the motor therefore proceeds with the field current gradually being weakened by operation of the controller 56. It should be noted that close control of the field strength is maintained by the controller 55 so as to ensure that the field current does not fall below a safe value.

In order to decelerate the motor the actuator 56 is operated and this has the effect of strengthening the current flowing in the field winding by controlling the controller 54 and the power amplifier 28. This has the effect of causing the motor to operate as a generator and gives re-generative braking. The maximum amount of deceleration is achieved by controlling the amount of field strengthening with respect to the armature current. During this time the armature windings 20 and 22 of the motor will remain in the parallel connection if deceleration occurs when that mode of connection obtains. In the event that re-acceleration of the motor is required after a period of deceleration, then if the speed of rotation of the armature is above that at which a switch from the series to parallel connection occurs, operation of the control 56 will effect a reduction in the value of the field current and the motor will start to accelerate. If, however, the speed of the armature has fallen to a sufficiently low value, the armature windings 20 and 22 will be switched so that they are connected in series and this is achieved by the fact that sensor 39 will produce a signal when the armature current attains a predetermined value, and this through the AND gate 38, will cause switching of the flip flop 41. An output will thus be provided to the AND gate 46 and also the OR gate 42. In this manner the AND gate 46 is conditioned to effect a switching to the series connection, and will in fact effect this connection when a signal is received from AND gate 47. The signal which is supplied to the OR gate 42 provides a signal to the AND gate 48 and this causes the controller 57 to increase the field current thus reversing the current flow through the armature windings. As previously described, when the current flow in the armature is near zero and as sensed by sensors 50 and 52, signals will be provided to the AND gate 47 and this will provide the required input to the AND gate 46 to effect switching of the flip flop 44 and thereby de-energisation of the winding 18 of the contactor 17. The motor will then accelerate with the armature windings connected in series and switching to the parallel connection will take place at the appropriate time.

It should be noted that, if the armature windings are connected in parallel and a sudden load is applied, sensor 39 will provide a signal to AND gate 38 and this will effect switching of the flip flop 41, and as a result the armature windings will be connected in series.

In an alternative arrangement the armature windings 20, 22 are wound on separate rotors which are mechanically coupled together. In addition, separate field windings are provided for the rotors and the field windings can be connected in series or in parallel the actual switching being achieved by a control circuit associated with the amplifier 28.

Figure 3:
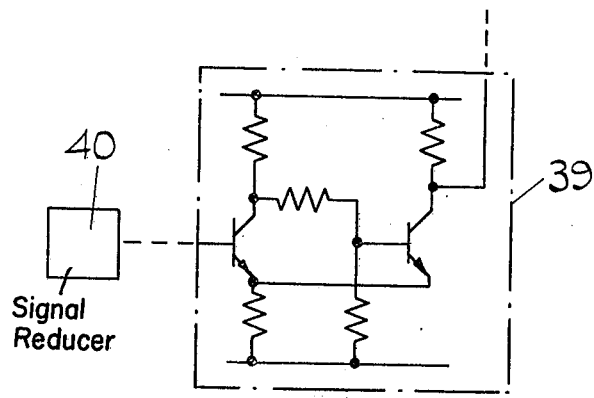
Figure 4:
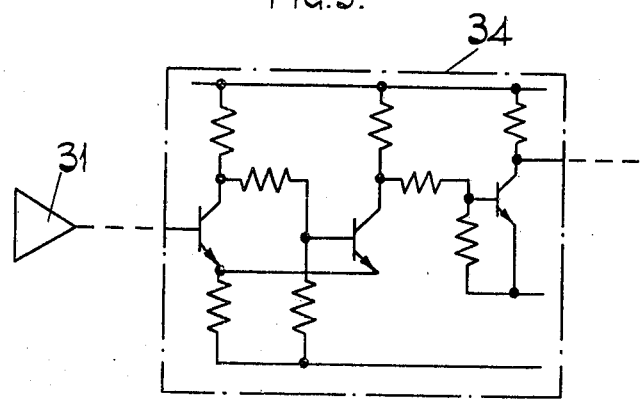

In the circuit, the modules comprise either standard components which are readily available or integrated circuits. In some instances, however, standard components are not available and in those cases, typical circuit configurations are shown in FIGS. 2–7 inclusive. The circuit shown in FIG. 3 is for the module 39 and the same circuit configuration can be used for the module 52. The circuit shown in FIG. 4 is for the module 34 and the same circuit configuration may be utilized for the modules 50 and 59.

Figure 5:
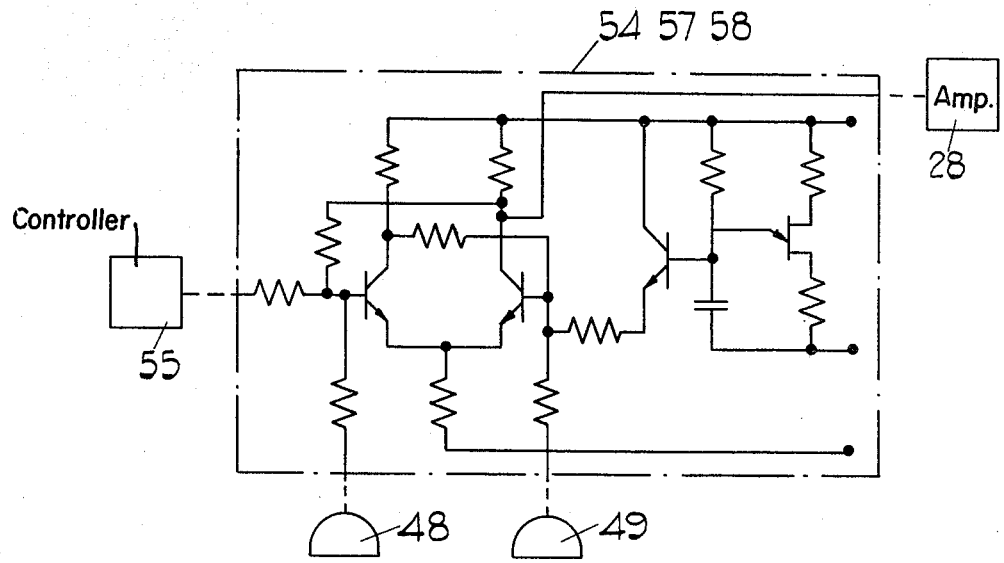
Figures 6, 7:
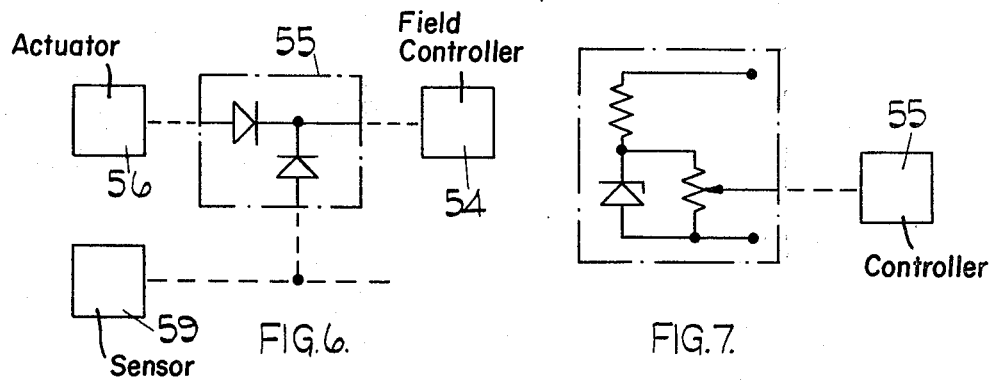

The circuit shown in FIG. 5 is a combined circuit for the modules 54, 57 and 58. It will be seen that most of the modules shown in FIGS. 2–7 require a d.c. power supply and this may be obtained from a power circuit not shown which is connected across the terminals 10 and 11. It is believed that the mode of operation of the various circuits shown in FIGS. 2–7 will be readily apparent to an expert knowing the intended duty of the circuits from the earlier description.

The circuit shown in FIG. 1 utilizes an electromechanical contactor but this may be replaced by the electrical contactor arrangement seen in FIG. 8. In FIG. 8 the armature windings 20, 22 are connected in series through a diode 65 and in parallel with but in back to back relationship to the diode is a thyristor 66 to the gate of which is applied a firing pulse when the windings are in the series mode and when regenerative braking occurs. In order to connect the windings in parallel two further thyristors 67, 68 are provided and the gates of these thyristors are provided with firing pulses when parallel connection of the windings is required. When the windings are connected in parallel the diode 65 no longer carries current. Moreover, to enable regenerative braking to take place with the windings in the parallel mode, a further pair of diodes 69, 70 are provided in parallel with and in back to back relationship with the thyristors 67, 68 respectively. The gating pulses for the thyristors are supplied by a module not shown which replaces the power amplifier 28 and which may form part of the module 44.

We claim:

1. A d.c. motor control system comprising a pair of armature windings mounted on a single rotor or on a pair of mechanically coupled rotors, a field winding or windings, the system including switch means operable to effect a change in the electrical connections of the armature windings to a pair of electric supply terminals, and means for effecting variation of the current flowing in the field winding or windings, said switch means comprising a contactor, the contactor serving in one condition to place said windings in series with each other and in the other condition in parallel with each other, said means for effecting variation in the current flowing in the field winding or windings comprising an operator controlled member, and a field current controller of the chopper type, said field current controller receiving a first control signal from said operator controlled member and acting to reduce the current flowing in the field windings when it is required to accelerate the motor, a power amplifier being further provided intermediate the controller and the field winding, said system additionally including means for providing a field current signal representative of the field current, means for providing an armature current signal representative of the armature current, switch means operable to control said contactor, said switch means being operated to cause the contactor to connect said armature windings in the correct parallel or series mode when the armature and field current are at predetermined values.

2. A system as claimed in claim 1 including means for momentarily adjusting the field current so that operation of said contactor can occur whilst substantially no current is flowing through its contacts.

3. A system as claimed in claim 2 including a first control for said switch means, said first control upon the receipt of two signals causing operation of said switch means, the first signal being derived from means responsive to said field current signal, and the second signal being generated by means which is responsive to the armature current signal and which provides said second signal when the armature current is substantially zero.

4. A system as claimed in claim 3 in which the means for momentarily adjusting the field current includes first and second AND gates the first of which provides a control signal to the controller to effect a momentary increase in the field current whilst the second of which provides a control signal to effect a momentary reduction in the field current, means for providing to each of said AND gates a first signal when a change in the connection of the armature windings should occur, the second signal required for operation of the first AND gate being provided by means which provides said second signal when the current flowing in the armature windings is above a predetermined minimum value with current being supplied to the armature windings and the second signal required for operation of the second AND gate being provided by means which provides said second signal when the current flowing in the armature windings is below a predetermined value with current being generated in the armature windings.

5. A system as claimed in claim 1 including a pair of AND gates the first of which provides a signal to said switch means to effect connection of the armature windings in the parallel mode and the second of which provides a signal to said switch means to effect connection of the armature windings in the series mode, means for providing a first signal to each of said pair of AND gates indicative of when the current in the armature windings is at or near zero the second signal to said first gate being provided by means which provide said second signal when the armature windings are connected in the series mode and when the field current is below a predetermined value, the second signal to said second gate being provided by means which provides said second signal when the armature windings are connected in parallel mode and the current flowing in the armature windings exceeds a predetermined value.

* * * * *